(12) United States Patent
Horn

(10) Patent No.: US 8,104,928 B1
(45) Date of Patent: Jan. 31, 2012

(54) ADJUSTABLE DIRECTION LED PUCK LIGHT

(75) Inventor: William A. Horn, Chino Hills, CA (US)

(73) Assignee: Cannon Safe Inc., San Bernardino, CA (US)

( * ) Notice: Subject to any disclaimer, the term of this patent is extended or adjusted under 35 U.S.C. 154(b) by 318 days.

(21) Appl. No.: 12/462,772

(22) Filed: Aug. 10, 2009

(51) Int. Cl.
*F21V 21/30* (2006.01)
(52) U.S. Cl. .............. 362/287; 362/296.01; 362/311.02; 362/372; 362/249.03; 362/249.1
(58) Field of Classification Search .................. 362/287, 362/296.01, 311.02, 372, 249.1, 249.03
See application file for complete search history.

(56) References Cited

U.S. PATENT DOCUMENTS

| | | | |
|---|---|---|---|
| 5,909,955 A | 6/1999 | Roorda | |
| 6,158,882 A | 12/2000 | Bischoff, Jr. | |
| 6,283,612 B1 | 9/2001 | Hunter | |
| 6,331,062 B1 | 12/2001 | Sinclair | |
| 6,578,994 B1 * | 6/2003 | Beyerlein | 362/490 |
| 6,641,283 B1 | 11/2003 | Bohler | |
| 6,979,107 B1 * | 12/2005 | Benensohn | 362/374 |
| 2002/0114155 A1 | 8/2002 | Katogi et al. | |
| 2005/0237746 A1 | 10/2005 | Yiu | |
| 2008/0080190 A1 * | 4/2008 | Walczak et al. | 362/294 |
| 2008/0278958 A1 | 11/2008 | Jiang | |
| 2009/0243495 A1 * | 10/2009 | Levine | 315/153 |

FOREIGN PATENT DOCUMENTS

CN 201066090 * 5/2008

* cited by examiner

*Primary Examiner* — Evan Dzierzynski
(74) *Attorney, Agent, or Firm* — Gordon K. Anderson

(57) ABSTRACT

An adjustable direction LED puck light is disclosed that incorporates an inner bowl shaped with external radial sides, an open top and a closed bottom incorporating an outwardly extending square post. A printed circuit board, including an LED cluster, is mounted in the interior of the inner bowl. A transparent lens is snapped into the open top of the inner bowl directly above the printed circuit board. An outer bowl body is, shaped inside with reversed internal radial sides in mirror image of the inner bowl. The inner bowl assembly is nested within the outer bowl body, permitting the inner bowl to be angularly reposition therebetween. A bezel is attached within an open top of the outer bowl body permitting the inner bowl to be manually repositioned at an angle to direct light emitting from the LED cluster in a desired direction. Mounting provisions permit the outer bowl body to be attached onto a fixed surface that contains a hole provided to receive the LED puck light.

15 Claims, 4 Drawing Sheets

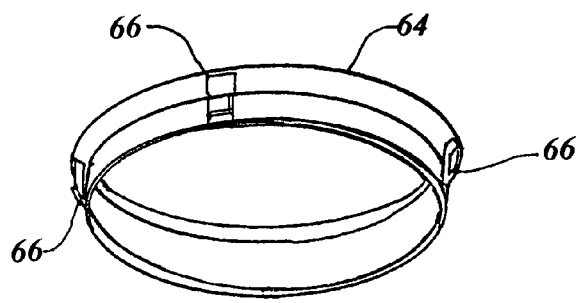
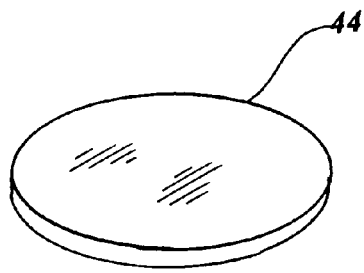
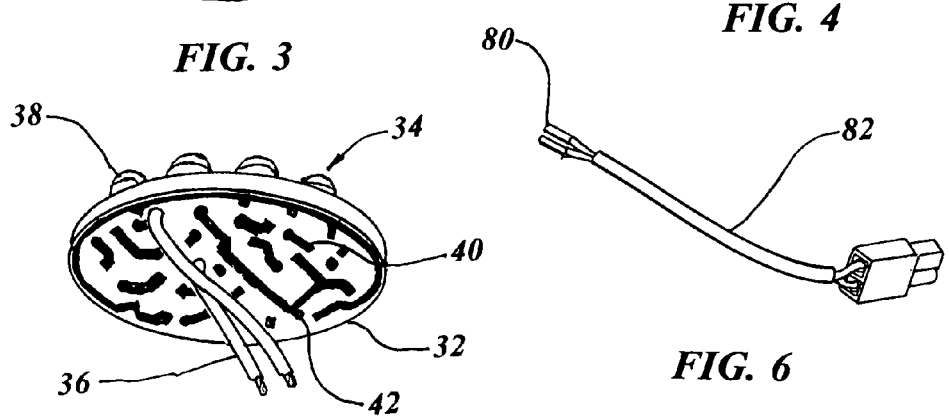
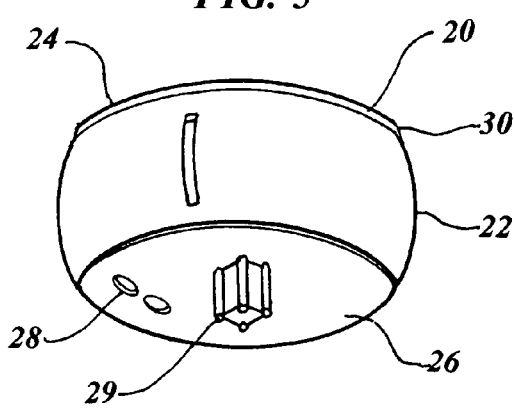
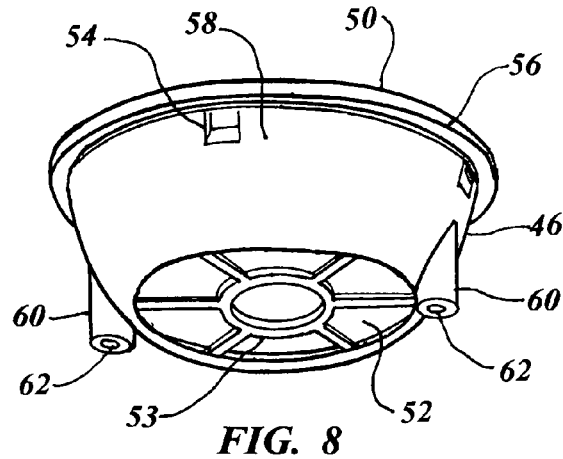
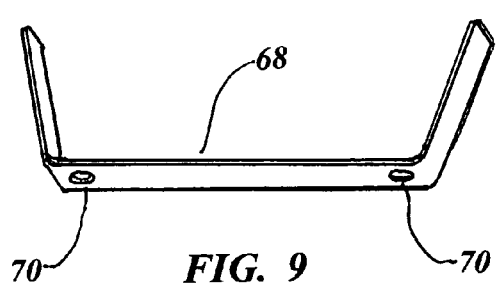
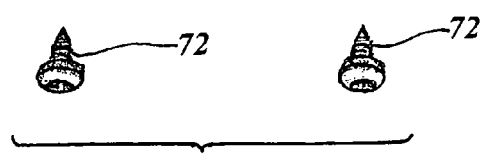

ADJUSTABLE DIRECTION LED PUCK LIGHT

TECHNICAL FIELD

The present invention relates to LED puck lights in general. More specifically to a LED puck light that is angularly adjustable in its light emitting direction.

BACKGROUND OF THE INVENTION

Previously, many types of LED lights have been used in endeavoring to provide an effective means to provide illumination for puck lights as well as other systems including interior vehicle lighting, safe lighting, and utility illumination strips.

The prior art listed below did not disclose patents that possess any of the novelty of the instant invention; however the following U.S. patents are considered related:

| Pat. No. | Inventor | Issue Date |
|---|---|---|
| 5,909,955 | Roorda | Jun. 8, 1999 |
| 6,158,882 | Bischoff Jr. | Dec. 12, 2000 |
| 6,331,062 B1 | Sinclair | Dec. 18, 2001 |
| 6,383,612 B1 | Hunter | Sep. 4, 2001 |
| 6,641,283 B1 | Bohler | Nov. 4, 2003 |

| patent application Publication No. | Inventor | Pub. Date |
|---|---|---|
| 2002/0114155 A1 | Katogi et al. | Aug. 22, 2002 |
| 2005/0237746 A1 | Yiu | Oct. 27, 2005 |
| 2008/0278958 A1 | Jiang | Nov. 13, 2008 |

Roorda in U.S. Pat. No. 5,909,955 discloses a light fixture having a lamp assembly, a cylindrical housing surrounding and supporting the lamp assembly, with a mounting ring surrounding and supporting the housing. The mounting ring includes an upper edge with a plurality of circumferentially spaced projections for engaging a support surface to define a plurality of airflow gaps. The mounting ring also has a pair of radially inwardly directed mounting tabs extending from the upper edge of the mounting ring for receiving fastener screws.

Bischoff Jr. in U.S. Pat. No. 6,158,882 teaches an LED semiconductor lighting system for illuminating vehicle interiors powered by the vehicle electrical system. The apparatus consists of a light tube with an interior space having a plurality of LEDs and current limiting resistors contained within the space. The intensity is controlled by a dimming module in contact with the LEDs and vehicle source of power.

U.S. Pat. No. 6,331,062 issued to Sinclair provides a portable electric light having housing, a source of electrical power, and an LED as a light source having a high internal resistance.

Hunter in U.S. Pat. No. 6,383,612 B1 discloses a LED light strip using a rigid hollow tube sized to accommodate a printed circuit board having a positive and negative bus. Resistors are in contact with the positive bus on one end and a LED on the other. The diodes are mounted through hole in the board with the anode in communication with the resistor and the diode connected to an adjacent diode in series. A pair of end caps enclose the tube and electrical cable is connected through the caps to the busses on the circuit board.

Bohler in U.S. Pat. No. 6,641,283 B1 teaches a LED module onto which are mounted LEDs which serve as the light source. An optical assembly focuses and dispenses the LED output to a desired light contour. The assembly includes a mounting base for attachment, such to the underside of a cabinet. A power source is enclosed in the module providing power for the LEDs.

Patent Application Publication No. 2005/0237746 A1 issued to Yiu is for a surface and recess mountable lighting fixture having a housing which includes an open end and a bottom wall defining a plurality of openings. A reflector is received within the housing and defines tabs extending from the edge to be received by slots in the sidewall to secure the reflector. A lamp holder in the housing engages a lamp bulb and a cover closes the open end with openings for communication of air therethough.

Jiang in Patent Application Publication No. 2008/0278958 A1 discloses a puck light with a magnetically held cover permitting the cover to be removed by hand without a tool. Other embodiments include a puck light with a cover and a base held together magnetically where the light projects a shape onto a support surface perpendicular to the support surface where the puck light is attached. The largest dimension of the projected shape is at most 4¼ inches.

For background purposes and as indicative of the art to which the invention is related reference may be made to the remaining cited Patent Application Publication No. 2002/0114155 A1 issued to Katogi et al.

BRIEF SUMMARY OF THE INVENTION

The invention is for an adjustable direction LED puck light which functions as a conventional LED puck light but is improved to incorporate and adjustable feature which permits the light to be moved unilaterally to obtain the best illumination for the application regardless of its initial location. The invention consists of an inner bowl having external radial sides, an open top and a closed bottom formed of a thermoplastic material, with a printed circuit board mounted within the interior of the inner bowl. The circuit board has an LED cluster providing the light source with a lens snapped into the open top of the inner bowl directly above the printed circuit board for protection. The inner bowl is positioned inside an outer bowl body that includes mating internal radial sides, and an open bottom, permitting the inner bowl to slide freely and allow the LED's to be angularly repositioned. A bezel is attached within the open top of the outer bowl body for retention and a bracket is provide to mount the puck light to a fixed surface through a clearance hole with the bracket compressing the light from the rear sandwiching it therebetween.

While puck lights are used commonly for under cabinet lighting, there are a myriad of other purposes and physical locations were this type of lighting has been used with great success. It is therefore the primary object of the invention to expand its utility by including directional adjustment of the light beam leaving the device. It may readily visualized that the usefulness of this type of light is greatly expanded reaching a larger market satisfying the need for greater numbers.

An important object of the invention is that this adjustable feature is accomplished with essentially no extra size increase as the exterior dimensions remain the same the only difference is in the internal design which utilizes a pair of mating bowl shape members permitting the internal bowl to pivot to a new angle.

Another object of the invention is that the angular adjustment of the beam is accomplished entirely by hand with no levers, handles, knobs or thread rotation to make the directional change.

Still another object of the invention is that the adjustment is easily accomplished by simply pushing one side of the bezel with a finger or grasping the bezel with ones fingers and thumb positioning the cluster to the desired location. Even thought this movement is basically effortless, there is still sufficient friction between the internal surfaces to allow the alignment to remain in the desired position.

Yet another object of the invention is that the adjustable feature is accomplished with a minimal cost increase as only one more part is required.

A final object of the invention is that the adjustable feature is unobtrusive and the basic dimensions are unchanged from a conventional puck light and it mounts in the usual manner.

These and other objects and advantages of the present invention will become apparent from the subsequent detailed description of the preferred embodiment and the appended claims taken in conjunction with the accompanying drawings.

BRIEF DESCRIPTION OF THE SEVERAL VIEWS OF THE DRAWING

FIG. 3 is a partial isometric view of the bezel with snap-in tabs, removed from the invention for clarity.

FIG. 4 is a partial isometric view of the transparent lens, completely removed from the invention for clarity.

FIG. 5 is a partial isometric rear view of the printed circuit board with leads extending therefrom, shown individually for clarity.

FIG. 6 is a partial isometric view of the two conductor lead with female disconnects and two conductor push-in plug, shown individually for clarity.

FIG. 7 is a partial isometric view of the inner bowl with pigtail holes in the bottom, shown individually for clarity.

FIG. 8 is a partial isometric view of the outer bowl body with tab openings and bosses, shown individually for clarity.

FIG. 9 is a partial isometric view of the channel shaped bracket in the preferred embodiment.

FIG. 10 is an exploded isometric view of the mounting screws in the preferred embodiment.

DETAILED DESCRIPTION OF THE INVENTION

Figure 1:
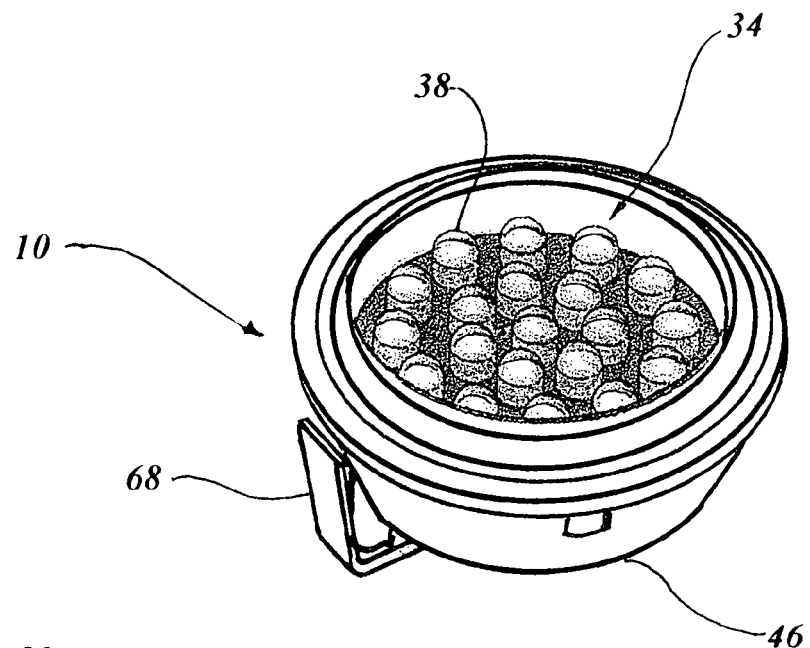
FIG. 1 is a partial isometric view of the adjustable direction puck light in the preferred embodiment

The best mode for carrying out the invention is presented in terms of a preferred embodiment of the adjustable direction LED puck light 10. This preferred embodiment is shown in FIG. 51 thorough 13 and is comprised of an inner bowl 20 having external radial sides 22, an open top 24, and a closed bottom 26, with the bottom 26 incorporating a outer facing square post 29 having radial corners, and a number, preferably two, pigtail holes 28.

Figure 11:
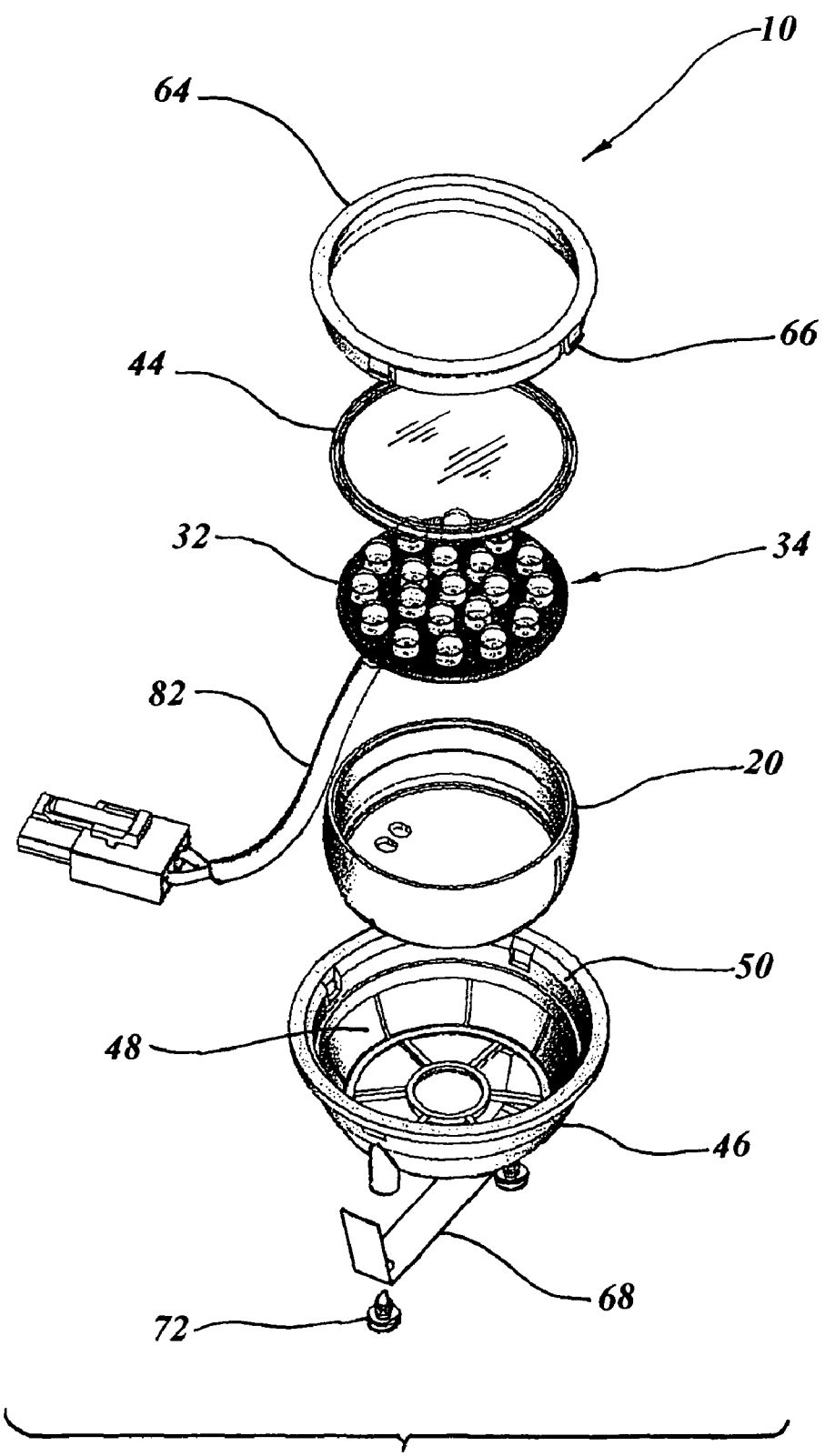
FIG. 11 is a partial isometric view of the adjustable direction puck light preferred embodiment.

The inner bowl 20, illustrated individually in FIG. 7, includes a straight lip 30 adjacent to the open top 24 directly above the external radial sides 22 which is used for retention of the inner bowl 20, as shown in FIG. 11. The inner bowl square post 29 is centrally positioned and functions to limit the amount of angular displacement. The inner bowl 20 is preferably formed from a thermoplastic material such as acrylic, allyl diglycol carbonate, polycarbonate, polystyrene, polysulfone, polyester sulfone or polyester.

A printed circuit board 32 incorporates an LED cluster 34 and a plurality of pigtails 36 which are attached directly to the printed circuit board 32. The printed circuit board 32 is disposed in the interior of the inner bowl 20 and preferably two of the pigtails 36, as illustrated in FIG. 5, to penetrate though the pigtail holes 28. A number of light emitting diodes (LED's) 38 form the LED cluster 34 and are centered on the top of the printed circuit board 32. Each light emitting diode 38 includes an anode and cathode lead which project from a base end with both of these leads penetrating holes in the circuit board 32 which engage negative traces 40 or positive traces 42 which are formed underneath on the underside of the circuit board 32 in a conventional manner. The circuit board LED cluster 34 has from 10 to 40 light emitting diodes (LED's) 38, with 20 being preferred, however any number may be used with equal ease and dispatch.

A transparent lens 44 is snapped into the open top 24 of the inner bowl 20 directly above the LED cluster 34 on the printed circuit board 32. The transparent lens 44 is preferably formed from a thermoplastic material such as acrylic methyl methacrylate, polycarbonate, poly vinyl chloride, cellulose acetate butyrate, or polypropylene.

An outer bowl body 46, illustrated in FIGS. 1, 2, 8 and 11, is configured to incorporate internal radial sides 48, an open top 50, an open bottom 52 having a cage structure 53 integrally formed therein and a plurality of tab openings 54 on the sides 48 adjacent to the open top 50, as shown singularly in FIG. 8. The outer bowl body 46 is also preferably formed from a thermoplastic material including acrylic, allyl diglycol carbonate, polycarbonate, polystyrene, polysulfone, polyester sulfone or polyester, and incorporates a peripheral flange 56 on top of the outer side 58, extending the diameter of the open top 50. For mounting purposes a pair of opposed bosses 60 are positioned on the outer sides 58 flush with the open bottom 52 and each include a bore 62 in the center thereof.

Figure 2:
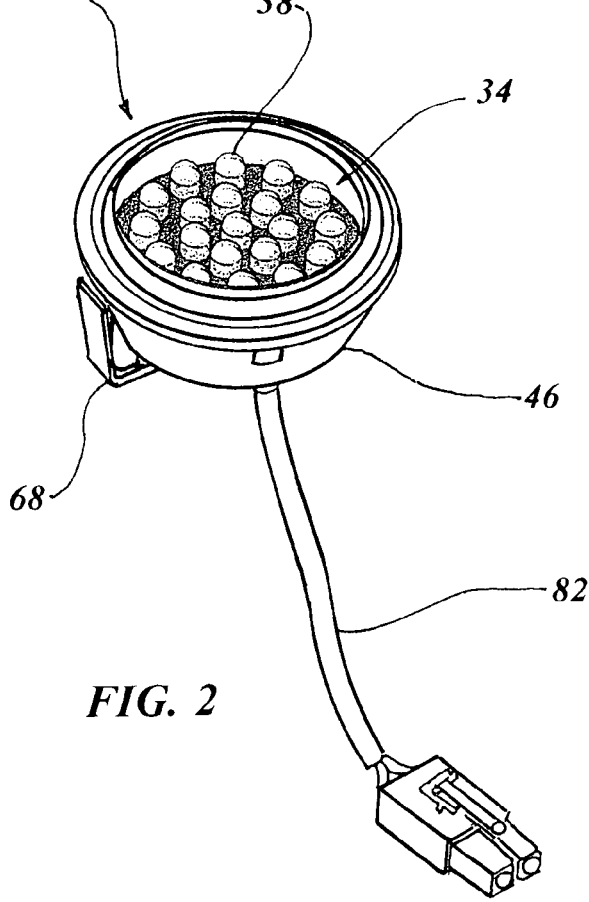
FIG. 2 is a partial isometric view of the adjustable direction puck light including the two conductor cable and plug.

The inner bowl 20, including the printed circuit board 32, LED cluster 34 and transparent lens 44, are disposed within the outer bowl body 46 permitting the inner bowl 20 to be nested and angularly reposition therebetween, as depicted in FIGS. 1 and 2. The outer bowl body 46 and inner bowl 20 are nested together with a close clearance fit therebetween, allowing the inner bowl 20 to initially nest together and angularly move with minimal resistance, and yet have sufficient friction to remain stationary when finally repositioned. The cage structure 53 is configured with a center ring and outwardly extending spokes, with the center ring configured sufficiently large to provide clearance for the inner bowl square post 29 to enter providing adjusting limits of the angular displacement of the inner bowl 20 within the outer bowl body 20.

A bezel 64, including a number of snap-in tabs 66, is mounted on the open top 50 of the outer bowl body 46 is used to hold the inner bowl 20 in place. The snap-in tabs 66 interface with the tab openings 54 in the outer bowl body 46 such that the inner bowl 20 is permitted to be manually repositioned at an angle to direct light emitting from the LED cluster 34 in an angularly adjustable direction. The bezel 64 is illustrated in FIGS. 1-3 and 11 and is formed from the same material as the inner bowl 20 and outer bowl body 46.

The adjustable direction LED puck light 10 is designed to be mounted on a fixed surface having a hole suitable in size to receive the outer bowl body 46, therefore means for mounting the outer bowl body onto a fixed surface consist of a channel shaped bracket 68 having two screw clearance holes 70 in the brackets channel web, as illustrated in FIG. 9. The channel shaped bracket 68 is sized to fit over the outer bowl body 46 and align the two screw clearance holes 70 on the outer bowl body opposed bosses 60. A pair of mounting screws 72, as shown in FIG. 10, jointly penetrate the two screw clearance holes 70 into the mating screw bores 62 in the bosses 60 compressing the LED puck light 10 between the outer bowl body peripheral flange 56 and a fixed surface having a mounting hole therein in the conventional manner of mounting instruments through a panel.

Figure 12:
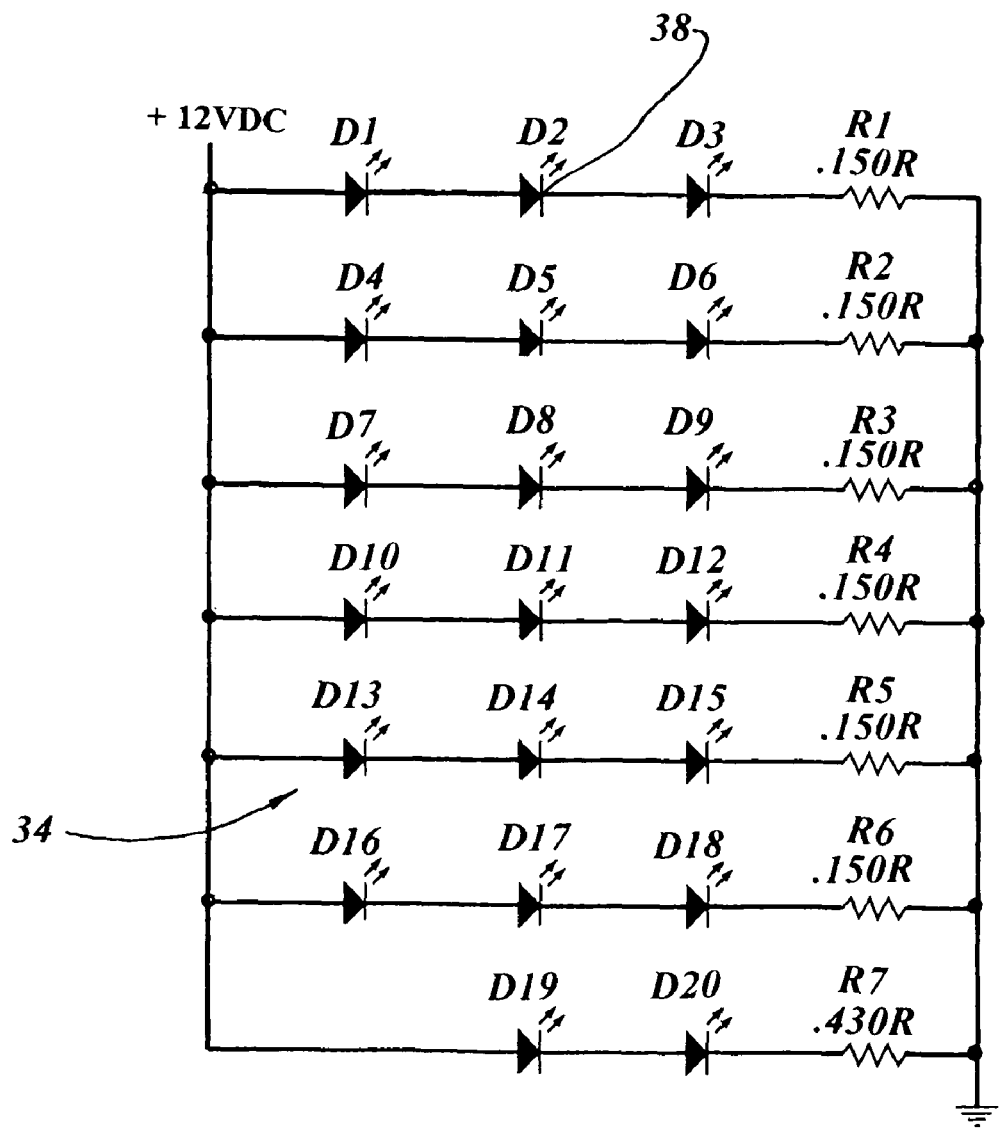
FIG. 12 is a schematic diagram of the LED cluster.
Figure 13:
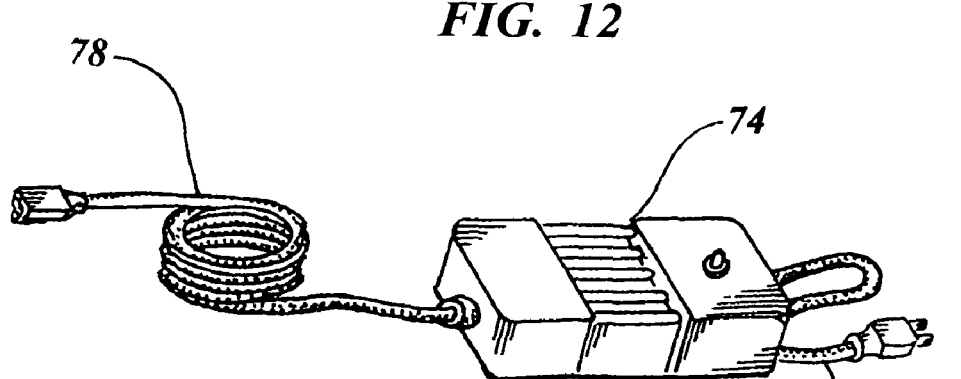
FIG. 13 is a partial isometric view of a typical power supply or LED driver.

While any suitable direct current electrical power source may be used to energize the adjustable direction LED puck light 10, FIGS. 12 and 13 illustrate one acceptable system. This system consisting of a power supply 74 converting alternating current mains power to a low voltage direct current, acting as an LED driver. The power supply 74 includes an input power cord 76 with a plug on its distal end and an output power cord 78 with an output connector on its distal end. The LED puck light 10 pigtails 36 are attached with pigtail connectors 80 to a two conductor lead 82 having a mating output connector which is connected to the output power cord 78, as illustrated in FIGS. 5, 6 and 13.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

The invention claimed is:

1. An adjustable direction LED puck light which comprises:
   an inner bowl having external radial sides, an open top and a closed bottom, with the bottom having a plurality of pigtail holes therethrough,
   a printed circuit board having an LED cluster and a plurality of pigtails attached to the printed circuit board, with the printed circuit board disposed within the inner bowl interior, and the plurality of pigtails penetrate though the pigtail holes,
   a transparent lens snapped into the open top of the inner bowl directly above the printed circuit board,
   an outer bowl body having internal radial sides, an open top, an essentially open bottom and a plurality of tab openings on the sides adjacent to the open top, wherein said inner bowl, including the printed circuit board and lens, is disposed within the outer bowl body, permitting the inner bowl to be nested and angularly reposition therebetween,
   a bezel having a plurality of snap-in tabs mounted on the open top of the outer bowl body holding the inner bowl in place, with the snap-in tabs interfacing with said tab openings such that the inner bowl is permitted to be manually repositioned at an angle to direct light emitting from the LED cluster in an angularly adjustable direction, and
   means for mounting the outer bowl body onto a fixed surface having a hole suitable in size to receive the outer bowl body.

2. The adjustable direction LED puck light as recited in claim 1 wherein said inner bowl further having a straight lip on said open top above said external radial sides for retention of the inner bowl by the bezel and an centrally positioned integral square post extending outwardly from said closed bottom.

3. The adjustable direction LED puck light as recited in claim 1 wherein said inner bowl is formed from a thermoplastic material selected from the group consisting of acrylic, allyl diglycol carbonate, polycarbonate, polystyrene, polysulfone, polyester sulfone and polyester.

4. The adjustable direction LED puck light as recited in claim 1 wherein said printed circuit board further comprises a board having traces underneath with a plurality of light emitting diodes having anode and cathode leads forming the LED cluster with the leads attached to negative traces or positive traces.

5. The adjustable direction LED puck light as recited in claim 1 wherein said circuit board LED cluster further comprises from 10 to 40 light emitting diodes (LED's).

6. The adjustable direction LED puck light as recited in claim 1 wherein said transparent lens is formed from a thermoplastic material selected from the group consisting of acrylic
   methyl methacrylate, polycarbonate, poly vinyl chloride, cellulose acetate butyrate, and polypropylene.

7. The adjustable direction LED puck light as recited in claim 1 wherein said outer bowl body and said inner bowl having a close clearance fit therebetween allowing the inner bowl to initially nest together and angularly move with minimal resistance yet have sufficient friction to remain stationary when finally repositioned.

8. The adjustable direction LED puck light as recited in claim 1 wherein said outer bowl body is formed from a thermoplastic material selected from the group consisting of acrylic, allyl diglycol carbonate, polycarbonate, polystyrene, polysulfone, polyester sulfone and polyester.

9. The adjustable direction LED puck light as recited in claim 1 wherein said outer bowl body further comprising a peripheral flange on top of outer sides thereby extending the diameter of said open top, and a cage structure on said essentially open bottom with the cage structure having center ring and outwardly extending spokes for restricting angular displacement of the of the inner bowl within the outer bowl body.

10. The adjustable direction LED puck light as recited in claim 9 wherein said outer bowl body further comprises a pair of opposed bosses positioned on outer sides flush with said open bottom each having a centrally located bore therein.

11. The adjustable direction LED puck light as recited in claim 10 wherein said means for mounting the outer bowl body onto a fixed surface further comprises a channel shaped bracket having two screw clearance holes in the brackets channel shape web.

12. The adjustable direction LED puck light as recited in claim 11 wherein said channel shaped bracket sized to fit over the outer bowl body and align said two screw clearance holes with bosses to coincide with said opposed bosses.

13. The adjustable direction LED puck light as recited in claim 11 wherein said means for mounting the outer bowl body further comprises a pair of mounting screws jointly penetrating said two screw clearance holes in the channel shaped bracket and the bores of the opposed bosses in the outer bowl body.

14. The adjustable direction LED puck light as recited in claim 9 wherein said channel shaped bracket is configured to compress the LED puck light between said outer bowl body peripheral flange and a fixed surface having a mounting hole therein.

15. The adjustable direction LED puck light as recited in claim 1 further comprising a power supply for converting alternating current mains power to a low voltage direct current, acting as an LED driver having an input power cord with a plug on a distal end and an output power cord with a output connector on a distal end attached to the LED puck light.

* * * * *